United States Patent
Kujirai

(10) Patent No.: US 7,858,196 B2
(45) Date of Patent: Dec. 28, 2010

(54) WATER-BASED HEAT-RADIATION-PREVENTIVE COATING MATRIAL FOR GLASS, HEAT-RADIATION-PREVENTIVE GLASS, AND METHOD OF PREVENTING HEAT RADIATION

(75) Inventor: Masami Kujirai, Kawaguchi (JP)

(73) Assignee: Suikoh Top Line Co., Ltd., Tokyo (JP)

( * ) Notice: Subject to any disclaimer, the term of this patent is extended or adjusted under 35 U.S.C. 154(b) by 181 days.

(21) Appl. No.: 10/511,146

(22) PCT Filed: Apr. 3, 2003

(86) PCT No.: PCT/JP03/04283
§ 371 (c)(1),
(2), (4) Date: Oct. 14, 2004

(87) PCT Pub. No.: WO03/087003
PCT Pub. Date: Oct. 23, 2003

(65) Prior Publication Data
US 2005/0214544 A1  Sep. 29, 2005

(30) Foreign Application Priority Data
Apr. 15, 2002  (JP) .............................. 2002-111573

(51) Int. Cl.
*B32B 9/04* (2006.01)

(52) U.S. Cl. .................. 428/447; 428/920; 106/287.11; 106/287.12; 106/287.15; 106/287.16

(58) Field of Classification Search .................. 428/920, 428/447; 106/287.11, 287.12, 287.15, 287.16
See application file for complete search history.

(56) References Cited

U.S. PATENT DOCUMENTS 4,658,059 A * 4/1987 Young et al. .................. 564/73

(Continued)

FOREIGN PATENT DOCUMENTS

JP  8-81238  3/1996

(Continued)

*Primary Examiner* — Margaret G Moore
(74) *Attorney, Agent, or Firm* — Wenderoth, Lind & Ponack, L.L.P.

(57) ABSTRACT

The heat radiation from a glass to the space inside can be prevented by adding 0.001 to 10% by weight of a silane coupling agent represented by the following general formula (I) (wherein X is a group reactive or compatible with organic materials. $R_1$, $R_2$, and $R_3$ are, each independently, OH or a group capable of generating a silanol upon hydrolysis and they may be same or different each other) to deionized water having a total anion content of 700 $mgCaCO_3/L$ or lower to prepare a water-based heat-radiation-preventive coating material for glasses, by applying said coating material on one side of a glass substrate to form a heat-radiation-preventive coating film and by disposing the coated glass substrate so that the coating film side faces the space inside. Therefore, the present invention provides a water-based heat-radiation-preventive coating material for glasses which enables a heat-radiation-preventive coating film excellent in adhesion to glasses and in durability to be evenly and easily formed, a heat-radiation-preventive glass having such coating film and a method of preventing heat radiation from a glass.

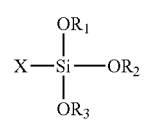

(I)

1 Claim, 1 Drawing Sheet

U.S. PATENT DOCUMENTS

| | | | |
|---|---|---|---|
| 5,250,185 A * | 10/1993 | Tao et al. | 210/654 |
| 5,363,994 A * | 11/1994 | Angeline | 222/529 |
| 5,411,585 A * | 5/1995 | Avery et al. | 106/287.1 |
| 5,518,627 A * | 5/1996 | Tomoi et al. | 210/682 |
| 5,757,564 A * | 5/1998 | Cross et al. | 359/870 |
| 5,811,012 A * | 9/1998 | Tanabe et al. | 210/669 |
| 5,907,015 A | 5/1999 | Sexsmith | |
| 5,944,862 A * | 8/1999 | Howes | 65/60.3 |
| 5,997,621 A * | 12/1999 | Scholz et al. | 106/13 |
| 6,001,163 A * | 12/1999 | Havey et al. | 106/287.13 |
| 6,292,748 B1 * | 9/2001 | Harrison | 701/213 |
| 6,512,132 B2 * | 1/2003 | Isoda et al. | 556/413 |
| 6,537,456 B2 * | 3/2003 | Mukhopadhyay | 210/652 |
| 6,929,748 B2 | 8/2005 | Avijit et al. | |

FOREIGN PATENT DOCUMENTS

| | | |
|---|---|---|
| JP | 2003-183580 | 7/2003 |
| WO | 96/04339 | 2/1996 |

* cited by examiner

WATER-BASED HEAT-RADIATION-PREVENTIVE COATING MATRIAL FOR GLASS, HEAT-RADIATION-PREVENTIVE GLASS, AND METHOD OF PREVENTING HEAT RADIATION

TECHNICAL FIELD

The present invention relates to a novel water-based heat-radiation-preventive coating material for glasses which can form a coating film having capability of preventing heat radiation, a novel heat-radiation-preventive glass wherein such coating film having capability of preventing heat radiation is applied to a glass substrate, and a method of preventing heat radiation using the same. More specifically, the present invention relates to a coating film-forming material which can form a coating film capable of preventing heat radiation from a window glass which has absorbed radiation heat to the inside of a closed space such as buildings or vehicles inexpensively and easily even when the surface of the window glass of such closed space is heated by solar radiation to rise in temperature, and a heat-radiation-preventive glass which can prevent heat radiation from the coating film side to the inside of a closed space by applying such heat-radiation-preventive coating film.

BACKGROUND ART

In what has a closed space having glass windows such as buildings and vehicles, generally, the glass surface is heated by solar radiation to become high temperature and the solar-radiation heat absorbed by the glass is radiated into the inside of a closed space such as the inside of a room or in the car to increase the internal temperature, which may cause various problems such that the effectiveness of an air conditioner comes down, especially in summer.

In order to prevent radiation of such solar-radiation heat, various glasses such as a heat wire absorbing glass which can absorb solar radiation and a heat wire reflection glass which can reflect solar radiation using various inorganic substances or organic substances have conventionally been developed.

However, these glasses are employing organic substances or inorganic substances which absorb solar-radiation heat as such, or metallic materials or inorganic substances which reflect solar-radiation heat as such so that the solar-radiation heat which penetrates the glasses and comes directly into the closed space can be intercepted.

In the glasses which can directly absorb or reflect the solar-radiation heat such as said heat wire absorbing glass and said heat wire reflection glass, a method increasing the amount of the substances which can absorb or reflect the solar-radiation heat directly may be available in order to improve the effectiveness of intercepting the solar-radiation heat. However, said method is accompanied by disadvantages in respect of practical use such that the cost becomes high and that the transparency of the glasses in a visible light zone decreases greatly and the inside becomes dark in result.

Moreover, there is a defect that a significant reduction of a thermal load of the inside of a closed space can not be counted upon, since the glass which has absorbed solar-radiation heat will radiate the heat absorbed by the glass again into the inside of a closed space gradually.

On the other hand, the glass which can reflect the solar-radiation heat does not become the cause of reradiation, since said glass hardly absorbs the light energy having the wavelength within the wavelength band of heat radiation at ordinary temperature. However, since it also uses metal, ceramics and the like which reflects an infrared light, it has such defect that it reflects even a visible light and consequently the inside of a closed space becomes dark.

In order to solve these problems, several ideas has been proposed such as a multilayer thermal insulating material wherein infrared radiation is reflected by sticking on a glass substrate a coating film whose visible light transparency is raised to about 70% by placing a metal layer in the middle and applying metallic cover layers on the both sides to adjust its refractive index (JP, 59-103749, A) and a low-emissivity glass wherein an $SnO_2$:F film is used as a low-emissivity film to reduce radiation and an $SnO_2$ film to an $SiO_2$ film are laminated between a glass substrate and said $Sn_2$:F film to reduce the generation of nonuniformity of color and a glass article using the same (JP, 2001-2449, A). However, the transparency of a visible light zone is still not enough.

Moreover, in order to prepare these glasses and films, it is necessary to use devices such as a vacuum deposition device and a sputtering device to coat metal or ceramics with the glass, which is largely disadvantageous, especially from an economical viewpoint.

From the above reasons, the development of an inexpensive heat-radiation-preventive glass which has high transparency at a visible light zone and is able to prevent heat radiation from the glass which has absorbed solar-radiation heat so as to reduce a thermal load caused by solar radiation has been waited for.

In light of the above problems, the inventors had found out that it is possible to prevent the heat radiation within the wavelength band of heat radiation at ordinary temperature from the glass which has absorbed solar radiation and has become high temperature effectively and to reduce a thermal load of the inside of a closed space, by forming a coating film wherein its visible light transparency is large and solar-radiation heat absorptivity and radiation heat absorptivity within the wavelength band of heat radiation at ordinary temperature are small on one side of a glass substrate, and disposing the glass so that said coating film side faces the inside of a closed space such as the inside of a room or in the car.

However, it is not necessarily easy to form a coating film having such capability of preventing heat radiation onto a glass substrate. That is, in order to apply the coating film onto window glasses of houses, window glasses of vehicles and the like, methods such as sticking on a glass by heat welding or adhesion a coating film which has previously formed in the shape of a film or a sheet, or a film or a sheet on which the coating film has been formed, coating plastics solved in a suitable solvent on a glass and then desiccating and solidifying or anchoring and the like are usually taken.

However, these methods have various defects such that they may require a large-scale equipment, that they may require a recovery treatment of a solvent which has been used for solving plastics when organic solvent-soluble type plastics is used, that it takes long time for desiccating and that the generation of unevenness of coating may often occur when a window glass having a coating film is produced by applying a coating film on the existing glass afterwards using water-soluble plastics.

Therefore, it had been difficult to stick a coating film on a glass without using films or sheets formed by uniformly coating onto various films by coater etc. Moreover, it had required specialized operators to stick these films and sheets on a window glass, which had been economically disadvantageous.

Therefore, development of an effective method for applying a heat-radiation-preventive coating film which is excellent in adhesion and durability onto the surface of one side of a glass uniformly, simply and economically had been waited for.

DISCLOSURE OF THE INVENTION

It is a problem to be solved of the present invention to provide a water-based heat-radiation-preventive coating material for glasses for applying a coating film excellent in adhesion to glasses and in durability evenly, easily and inexpensively, a heat-radiation-preventive glass applied said coating film and a method of preventing heat radiation by which heat radiation within the wavelength band of heat radiation at ordinary temperature from a glass heated by solar radiation to become high temperature is prevented effectively.

As a result of intensive studies, the inventors have found that a water-based heat-radiation-preventive coating material for glasses for forming a coating film excellent in adhesion to glasses and in durability evenly, easily and inexpensively can be obtained by adding a silane coupling agent to deionized water, and has accomplished the present invention.

That is, the present invention relates to a water-based heat-radiation-preventive coating material for glasses, a heat-radiation-preventive glass using the same, a method of producing said glass and a method of preventing heat radiation using said glass described in the following (1) to (9).

(1) A water-based heat-radiation-preventive coating material for glasses wherein 0.001 to 10% by weight of a silane coupling agent represented by the following general formula (I) is added to deionized water having a total anion content of 700 mgCaCO$_3$/L or lower.

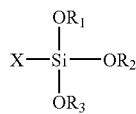
(I)

(In the formula, X is a group reactive or compatible with organic materials. $R_1$, $R_2$, and $R_3$ are, each independently, OH or a group capable of generating a silanol upon hydrolysis and they may be same or different each other.)

(2) The water-based heat-radiation-preventive coating material for glasses according to (1), characterized in that X in said general formula (I) is an amino group.

(3) The water-based heat-radiation-preventive coating material for glasses according to (1) or (2), wherein 0.005 to 3.5% by weight of a cationic surfactant or a nonionic surfactant is comprised in.

(4) A heat-radiation-preventive glass characterized in that a heat-radiation-preventive coating film formed from a coating layer of said water-based heat-radiation-preventive coating material for glasses according to any of (1) to (3) is applied onto one side of a glass substrate.

(5) The heat-radiation-preventive glass according to (4), characterized in that visible light transparency of said heat-radiation-preventive coating film is larger than visible light transparency of said glass substrate and solar-radiation heat absorptivity and radiation heat absorptivity within the wavelength band of heat radiation at ordinary temperature of said heat-radiation-preventive coating film are smaller than solar-radiation heat absorptivity and radiation heat absorptivity within the wavelength band of heat radiation at ordinary temperature of said glass substrate.

(6) The heat-radiation-preventive glass according to (4) or (5), characterized in that said heat-radiation-preventive coating film has visible light transparency of 90% or more, solar-radiation heat absorptivity of 0.01 to 11% and radiation heat absorptivity within the wavelength band of heat radiation at ordinary temperature of 0.01 to 20%.

(7) A method of producing a heat-radiation-preventive glass which comprises a coating step wherein a coating layer is formed by coating said water-based heat-radiation-preventive coating material for glasses according to any of (1) to (3) onto one side of a glass substrate and a desiccating step wherein a heat-radiation-preventive coating film is formed by desiccating said coating layer.

(8) The method of producing a heat-radiation-preventive glass according to (7), characterized in that said heat-radiation-preventive coating film has visible light transparency of 90% or more, solar-radiation heat absorptivity of 0.01 to 11% and radiation heat absorptivity within the wavelength band of heat radiation at ordinary temperature of 0.01 to 20%.

(9) A method of preventing heat radiation from a glass which has absorbed solar-radiation heat, wherein a heat-radiation-preventive glass according to any of (4) to (6) is disposed so that the glass substrate side faces the side that solar-radiation heat is irradiated whereby heat radiation from said heat-radiation-preventive coating film side is prevented.

Glasses absorb irradiated heat such as solar-radiation heat irradiated from sunlight and the like. The wavelength range of sunlight is 0.3 μm to 3.0 μm, and ordinary transparent glass plates usually absorb not only light of infrared region having wavelength of 2.5 μm or more but also visible light and near infrared light having wavelength of not more than 2.5 μm. By such absorption of solar-radiation heat, the temperature of the glasses increase and the heat absorbed by the glasses is emitted to the inside of a room or the outside air by convection or radiation.

As the scale of the convection of the air inside of a closed space such as the inside of a room or in the car is small, the scale of convective heat transfer is relatively small. On the other hand, since heat transfer by radiation is direct heat transfer between glasses and substances inside such as the inner air or internal objects, it is hardly influenced by the convection of the air. That is, as for the incident heat emitted into the inside of a space through glasses, the rate of heat transfer by radiation becomes large in a closed space.

In addition, the solar-radiation heat absorbed by a glass becomes larger as the thickness of the glass becomes thick, and becomes about 6% or more even in the glass of 3 mm thickness. Then, heat radiation from the glass gives a large thermal load to the inside of a closed space. Therefore, it is believed that reduction of a thermal load of the inside of a closed space can be achieved by preventing reradiation of solar-radiation heat absorbed by the glass into the inside of a closed space so as to emit a large quantity to the open air.

Generally, unlike inorganic materials, absorption and reflection of organic materials are small and transparency thereof is large within a visible light zone and an infrared zone. The inventors have found out that a thermal load of a space inside can be reduced with hardly lowering visible light transparency of a glass when a coating film made of a particular organic material whose absorption and reflection are small and transparency is large in an infrared zone is applied onto one side of the glass and the glass is disposed so that the coating film side faces the inside of a closed space.

Here, the wavelength range of radiation emitted from sunlight is 0.3 μm to 3.0 μm. On the other hand, the wavelength range of heat radiation emitted from a glass whose temperature has risen by absorbing the solar-radiation heat is 5 μm to 50 μm which is the wavelength range of heat radiation at ordinary temperature. Therefore, in order to prevent the emission of heat absorbed by the glass into the inside of a closed space by radiation, it is preferable to prevent the heat radiation within the wavelength range of 5 μm to 50 μm.

Namely, what is necessary is just to make radiation heat absorptivity of the wavelength band of heat radiation at ordinary temperature on the surface of a glass small. That is, it is preferable to apply a coating film made of a material whose absorptivity within the wavelength band of heat radiation at ordinary temperature in 5 μm to 50 μm is small onto the surface of a glass. Then, by disposing a glass on which such coating film is applied so that the coating film side faces the inside of a closed space, the amount of radiation heat transfer between the glass and internal substances decreases further.

The present invention is further described in detail below.

1. A water-based heat-radiation-preventive coating material for glasses:

The water-based heat-radiation-preventive coating material for glasses according to the present invention is characterized in that it is a mixture of a silane coupling agent and deionized water. That is, the water-based heat-radiation-preventive coating material for glasses of the present invention is formed by solving a silane coupling agent into water which is a base material.

(1) A Silane Coupling Agent:

The silane coupling agent used in the present invention is represented by the following general formula (I).

In the formula (I), X is a group reactive or compatible with organic materials. $R_1$, $R_2$, and $R_3$ are, each independently, selected from the group consisting of OH and a group capable of generating a silanol upon hydrolysis and they may be same or different each other.

Examples of the group X include an organic group such as an amino group, an aminoalkyl group, a vinyl group, an epoxy group, a glycidoxy group, an acryl group, a methacryl group, a mercapto group and an alkyl group containing these groups.

Examples of the groups $R_1$, $R_2$, and $R_3$ include an alkoxy group, an aryloxy group, an aralkyloxy group, an allyloxy group and a halogen group besides OH group. Among these, a methoxy group, an ethoxy group and a halogen group such as chlorine are preferable.

Examples of such silane coupling agent include vinyl trichloro silane, vinyl trimethoxy silane, vinyl triethoxy silane, vinyl tris(β-methoxy ethoxy) silane, β-(3,4-epoxy cyclohexyl) ethyl trimethoxy silane, ν-glycidoxypropyl trimethoxy silane, ν-glycidoxypropyl methyldimethoxy silane, ν-glycidoxypropyl triethoxy silane, 3,4-epoxy cyclohexyl ethyl trimethoxy silane, aminopropyl trimethoxy silane, aminopropyl triethoxy silane, N-(β-aminoethyl) γ-aminopropyl trimethoxy silane, N-(β-aminoethyl) γ-aminopropyl triethoxy silane and N-(β-aminoethyl) γ-aminopropyl methyldimethoxy silane.

Among these, silane coupling agents such as vinyl trichloro silane, vinyl trimethoxy silane, vinyl triethoxy silane, vinyl tris (β-methoxy ethoxy) silane, β-(3,4-epoxy cyclohexyl) ethyl trimethoxy silane, ν-glycidoxypropyl trimethoxy silane, ν-glycidoxypropyl methyldimethoxy silane, ν-glycidoxypropyl triethoxy silane and 3,4-epoxy cyclohexyl ethyl trimethoxy silane are easy to gelate since the condensation reaction of silanol groups thereof tends to occur rapidly in an aqueous solution. Therefore, it is desirable to apply to a glass immediately after blending the silane coupling agent with deionized water.

Some silane coupling agents are difficult to hydrolyze. In such a case, the rate of hydrolysis can be accelerated by adding about 0.1 to 2% by weight of acetic acid or a mixture of acetic acid and alcohol. As for a silane coupling agent containing epoxy groups, since hydrolysis may not progress in only water or with alcohol, it is preferable to use a catalyst in such a case.

As for a silane coupling agent containing amino groups such as aminopropyl trimethoxy silane, aminopropyl triethoxy silane, N-(β-aminoethyl) γ-aminopropyl trimethoxy silane, N-(β-aminoethyl) γ-aminopropyl triethoxy silane and N-(β-aminoethyl) γ-aminopropyl methyldimethoxy silane, the rate of hydrolysis is usually rapid and it is not necessary to use a catalyst. In addition, because of the interaction with amino groups, it will take time before gelating stably in an aqueous solution. Therefore, in order to use by storing in the long term, it is preferable to select a silane coupling agent containing amino groups. However, when it is stored for too long term, the amino groups will be oxidized to become $NO_2$ and to be colored with red or yellow. Thus, it is preferable to use it in combination with an antioxidant and the like in order to use for long-term storage.

Such silane coupling agents can easily be synthesized by persons having ordinary skill in the art at their request. Various types of commercial products are also available. For example, a brand name "KBE 403", "KBM 603" and "KBM 6123", all manufactured by Shin-Etsu Chemical Co., Ltd, are available.

In general, when adhering a coating material to a substance, it is known that a polar coating material is easy to adhere to a polar substance and a non-polar coating material is easy to adhere to a non-polar substance. For example, the surface of a clear glass is highly polarized because it is electrically disproportional. However, since many kinds of plastics are non-polar, they cannot adhere to the glass surface easily. Therefore, in order to adhere glasses and plastics closely, a material such as epoxy, butyral, polyvinyl acetate and polyacrylate having polar groups such as —OH groups, —COOH groups, —C=O groups, —COOOCH₃ groups are used. In addition, various kinds of silane coupling agents are also used as a binder to adhere a polar glass surface and non-polar plastics.

However, in the present invention, it is found out that a silane coupling agent can not only be used as a mere binder but can also be used as a material which exhibits effect of preventing heat radiation independently by forming a heat-radiation-preventive coating film. Therefore, a coating film having not only close adhesiveness but also excellent heat-radiation-preventive effect and high transparency at a visible light zone can be formed only by applying a coating material comprising a silane coupling agent to a polar glass surface.

Although there are many points which are not clear with regard to the hydrolysis reaction of a silane coupling agent, it is believed that the alkoxy silyl group (Si—OR) of a silane coupling agent, when it is dissolved in water, will hydrolyze immediately and will turn into a silanol group which combines with inorganic substances (metal) and the like to form Si—O-M (glass, metal, etc.) bonds. And a coating film of chain polysiloxane generated by polymerization of the silanol groups during desiccation at ordinary temperature is formed on the glass surface.

The coating film of polysiloxane formed on the surface and the glass is adhered by a coupling reaction. Therefore, unlike the case wherein polymer is only sticking to the glass, a heat-radiation-preventive coating film for glasses highly excellent in close adhesion and durability having high visible light transparency and small radiation heat absorptivity within the wavelength band of heat radiation at ordinary temperature can be formed. And the combination of this coating film of polysiloxane and the glass unexpectedly brings an excellent heat-radiation preventive effect to the glass plate.

The silane coupling agent represented by the above formula had been used as a metallic coating composition (JP, Kokoku H6-19080, B) and a water-repellent antifouling coating composition (JP, Kokai H6-192596, A) by blending with polymer. However, there had been no example wherein the silane coupling agent is used independently or in the form of a composition as a heat-radiation-preventive coating material for glasses, and furthermore there had been no example of a heat-radiation-preventive coating material for glasses wherein the silane coupling agent is used to form a water-based material.

(2) Deionized Water:

Water as a base material used in the water-based heat-radiation-preventive coating material for glasses of the present invention is deionized water having a total anion content of 700 mgCaCO$_3$/L (liter) or lower.

That is, the total anion content of water before adding a silane coupling agent (after dissolving all other optional ingredients) is 700 mgCaCO$_3$/L or lower, preferably 600 mgCaCO$_3$/L or lower, more preferably 580 mgCaCO$_3$/L or lower.

A silanol group combines with inorganic substances (metal, etc.) and the compounds thereof which are suspended in water or inorganic substances (metal, etc.) and the compounds thereof which are dissolved in water and the like. And it combines with the inorganic ions constituting salts in water, for example, $Ca^{2+}$, $Na^+$, $K^+$, $Mg^{2+}$, $Fe^{2+}$, $Fe^{3+}$, etc. Since the silanol group has cation exchange ability with weak acidity, when the anion which is free in water remains, it will react with the silanol group.

Therefore, as for the water for solving the silane coupling agent, it is necessary to use the one wherein suspended solids of inorganic substances (metal, etc.) in water, inorganic ions dissolved in water and free anions have been removed by the methods such as filtration and ion exchange treatment. Namely, it is necessary to use deionized water wherein total cations and free anions has been removed to a certain amount or lower.

In neutral water, all cations constitute salts. Therefore, what is necessary is just to measure the amount of anions in order to measure the amount of cations. And by carrying out oxidimetry with potassium permanganate, anions which constitute salts and also anions which are free in water (free carbonic acid, silicic acid, etc.) can be measured. Namely, the amount of total cations and free anions can be measured by measuring the amount of total anions (the anions which constitute salts and the anions which are free in water). Thus, the term "total anions" here means that total cations (the cations which constitute salts)+free anions.

In the present invention, as a unit of the measured total anion content, "mgCaCO$_3$/liter" obtained by converting the amount of consumption of potassium permanganate to the amount of CaCO$_3$ is used. Therefore, even if a value obtained by measuring the amount of total cations and free anions by methods other than the method of using potassium permanganate, the amount of total anions of the present invention (mgCaCO$_3$/L) can be calculated by converting the value into the amount of CaCO$_3$. As for the ion removal method, any of the conventionally well-known methods such as filtration and ion exchange treatment using cation-exchange resins, anion-exchange resins and the like can be used.

In addition, when organic materials exist in water, the group X in the above general formula (I) will react or dissolve mutually with them. Therefore, it is desirable to use the water from which organic materials have been removed. Further, since potassium permanganate is consumed when organic materials and the like exist in water, it is necessary to carry out the measurement of consumption of potassium permanganate after removing organic materials in water. The removal of organic materials also can be carried out by means of filtration, ion exchange treatment and the like.

(3) Concentration of Silane Coupling Agent:

The concentration of a silane coupling agent in the water-based heat-radiation-preventive coating material for glasses of the present invention is 0.001 to 10% by weight, preferably 0.005 to 8% by weight, more preferably 0.01 to 6% by weight, most preferably 0.01 to 5% by weight based upon the total weight of deionized water.

In general, silanol groups are highly unstable in an aqueous solution, and the condensation reaction of silanol groups occurs with time and the gelation occurs in the event. When the silanol groups gelate to produce polysiloxane, it becomes difficult to form a Si—O-M bond with the surface of a glass and the formation of a heat-radiation-preventive coating film on the heat-radiation-preventive glass becomes difficult. The more the concentration of silanol groups dissolved in water is high, the more the condensation reaction tends to occur.

On the other hand, when the content of a silane coupling agent dissolved in water is small, the concentration of silanol groups will become too low, and the formation of a coating film which covers the surface, i.e., the formation of a heat-radiation-preventive coating film, will become difficult on the contrary. From the viewpoint of these things, it is preferable to adjust the content of a silane coupling agent dissolved in water to fall into the above-mentioned range based upon the total amount of deionized water.

(4) Other Optional Ingredients:

When applying the water-based heat-radiation-preventive coating material of the present invention to a glass, if the coating material is easily repelled and it is difficult to coat evenly, it is preferable to make easy to apply by enlarging wettability. A surface active agent is effective in enlarging wettability and there is no particular restriction in the kind thereof and the like. However, since an anion and a silanol group may react with each other if an anionic surfactant and an amphoteric surfactant are used, it is desirable to use a cationic surfactant or a nonionic surfactant usually.

Examples of a cationic surfactant include a monoalkylamine salt, a dialkylamine salt, a trialkylamine salt, an alkyl trimethyl ammonium chloride (bromide or iodide) and an alkyl benzalkonium chloride and the like. Examples of a nonionic surfactant include glycerin fatty acid ester, sorbitan fatty acid ester, saccharose fatty acid ester, polyoxyethylene alkyl ether, polyoxyethylene alkyl phenyl ether, polyoxyethylene, polyoxypropylene glycol, fatty acid polyethylene glycol, fatty acid polyoxyethylene sorbitan, fatty acid alkanolamide and the like.

In general, the true character as a surface active agent appears for the first time over the concentration of critical micelle concentration. In the water-based heat-radiation-preventive coating material for glasses of the present invention, what is necessary is just to enable it to apply to a glass surface evenly. However, on the other hand, it may become the cause of unevenness of coating when a surfactant is put in too much in large quantities. Therefore, it is preferable that the concentration of a cationic surfactant or a nonionic surfactant is around 0.005 to 3.5% by weight, preferably 0.01 to 2% by weight based upon the total weight of the coating material.

In addition, it is possible, if necessary, to include methylparaben, alcohol or a decomposition inhibitor or an antioxidant which do not react or dissolve each other with a silane coupling agent, etc. in the water-based heat-radiation-preventive coating material for glasses in order to prevent decomposition or facilitate hydrolysis.

In the case of using alcohol, it is preferable to use about 1 to 10% by weight of lower alcohol such as methanol, ethanol or IPA.

(5) Method of Producing a Water-Based Heat-Radiation-Preventive Coating Material for Glasses:

The water-based heat-radiation-preventive coating material for glasses of the present invention is obtained by adding and dissolving a silane coupling agent to the above-mentioned deionized water together with other optional ingredients if necessary. Though the order of blending is not particularly restricted, it is preferable to blend a silane coupling agent after blending other optional ingredients from the viewpoint of preventing gelation and the like.

More particularly, after adding a silane coupling agent to deionized water, or after dissolving a silane coupling agent to lower alcohol such as methanol and ethanol and then adding deionized water thereto, a silane coupling agent solution can be prepared by adding a hydrolysis catalyst such as acetic acid, hydrochloric acid and Sn if necessary, and carrying out agitation, supersonic vibration and the like.

(6) Use of the Water-Based Heat-Radiation-Preventive Coating Material for Glasses:

The water-based heat-radiation-preventive coating material for glasses of the present invention makes enables a heat-radiation-preventive coating film excellent in adhesiveness and in durability wherein visible light transparency is large and solar-radiation heat absorptivity and radiation heat absorptivity within the wavelength band of heat radiation at ordinary temperature are small to be evenly and easily formed by coating it onto one side of various glass substrates used as window glasses of structures, buildings, vehicles and the like.

Since a glass complex consisting of a glass substrate and a heat-radiation-preventive coating film thus obtained has high visible light transparency and it can prevent efficiently the heat radiation from the glass heated by solar radiation to the coating film side, a thermal load inside can be reduced by disposing it so that the coating film side faces the inside of a closed space such as the inside of a room or in the car to prevent the heat radiation to the space inside efficiently and to radiate a good deal of the heat absorbed by the glass to the open air. Moreover, a heat-radiation-preventive coating film can be formed and the same effect can also be acquired by applying the above-mentioned coating material afterwards to a window glass of structures, buildings, vehicles and the like which are already existing from before.

2. Heat-Radiation-Preventive Glass:

The heat-radiation-preventive glass of the present invention is the one wherein a heat-radiation-preventive coating film formed from a coating layer consisting of the above-mentioned water-based heat-radiation-preventive coating material for glasses of the present invention is applied on one side of a glass substrate and is composed of a complex of a glass substrate and a heat-radiation-preventive coating film.

(1) Glass Substrate:

The kind of glass used for a glass substrate is not particularly restricted, and it may not only be a transparent plate glass but also be a heat absorbing glass, a heat wire reflection glass and the like. Anything having the character which can radiate solar-radiation heat absorbed during being exposed to solar radiation can demonstrate the effect of the present invention sufficiently.

As for a heat absorbing glass and a heat wire reflection glass, since the prevention of heat radiation from the glass heated by absorbing solar radiation can be achieved as well as the blocking of direct incident solar radiation by further applying the above-mentioned heat-radiation-preventive coating film on one side of said glasses, the effect of reducing a thermal load according to the present invention can be furthermore improved.

Though the thickness of the glass substrate is not particularly restricted, it is preferable that the thickness is 0.1 to 20 mm, more preferably 1 to 20 mm. Even if the materials of the glass substrates are same, the more the thickness becomes thick, the more solar-radiation heat absorptivity increases and the heat radiation from the glass increases, and the effect of intercepting heat radiation from the glass becomes large.

(2) Heat-Radiation-Preventive Coating Film:

The heat-radiation-preventive coating film in the heat-radiation-preventive glass of the present invention is formed by a coating layer consisting of the above-mentioned water-based heat-radiation-preventive coating material for glasses according to the present invention. That is, it is formed by coating said water-based heat-radiation-preventive coating material for glasses on one side of a glass substrate and then desiccating it.

Furthermore, it is preferable to form the heat-radiation-preventive coating film so that visible light transparency of said heat-radiation-preventive coating film is larger than visible light transparency of the glass substrate and solar-radiation heat absorptivity and radiation heat absorptivity within the wavelength band of heat radiation at ordinary temperature of said heat-radiation-preventive coating film are smaller than solar-radiation heat absorptivity and radiation heat absorptivity within the wavelength band of heat radiation at ordinary temperature of the glass substrate.

Here, the relationship between the amount of radiation heat transfer and visible light transparency, solar-radiation heat absorptivity and radiation heat absorptivity of a substance is mentioned below.

<Relationship Between the Amount of Radiation Heat Transfer and the Radiation Rate of a Substance>

The radiation heat Q with regard to radiation heat transfer is represented by the following formula and it is possible to transfer even in vacuum.

$$Q = \sigma \cdot \epsilon \cdot (T/100)^4$$

wherein $\sigma$ is a Stefan-Boltzmann constant, $\epsilon$ is the radiation rate of a substance, T is absolute temperature of a substance. As clear from this formula, the calorie radiated from a substance is reduced by reducing the radiation rate.

Moreover, the amount of heat transfer $Q_2$ by radiation heat transfer which is transferred from the surface of a substance to a substance such as a fluid in low temperature zone is represented by the following formula:

$$Q_2 = \sigma \times f(\epsilon) \times [(T_r/100)^4 - (T_0/100)^4]$$

wherein $\sigma$ is a Stefan-Boltzmann constant, $f(\epsilon)$ is a radiation constant of radiation heat transfer among substances, $T_r$ is a surface temperature of a substance (K), $T_0$ is a surface temperature of a substance in low temperature zone (K).

AS clear from this formula, the amount of radiation heat transfer between the substances is reduced when the radiation constant of radiation heat transfer between the surfaces of the substances is reduced.

Then, the radiation heat transfer constant is represented by the following formula:

$$f(\epsilon) = 1/(1/\epsilon_1) + (1/\epsilon_2) - 1$$

wherein $\epsilon_1$ is the radiation rate of a substance in a high temperature zone side and $\epsilon_2$ is the radiation rate of a substance in a low temperature zone side.

Therefore, the radiation heat transfer constant $f(\epsilon)$ becomes small and the amount of radiation heat transfer is reduced by reducing the radiation rate of either of the substances.

That is, when there are same materials on both sides of a glass, the heat transfer by radiation from the surface of the glass becomes same. Therefore, when a coating film consisting of a material having small radiation rate is formed on one side of a glass, the radiation rate of the surface wherein the coating film is formed becomes small, and the radiation heat transfer constant between the surface wherein the coating film is formed and a substance becomes small and is reduced compared with the amount of radiation heat transfer from the surface of a glass wherein the coating film is not formed.

Namely, when a coating film consisting of a material having small radiation rate is formed on the surface of indoor side of a window glass disposed in closed buildings or vehicles, the amount of radiation heat transfer between the surface of indoor side of the glass heated by being exposed to solar radiation and a substance such as the air in the room (the inside of a closed space) is reduced and a good deal of the heat absorbed by the glass is released to the open air and thermal load of the inside is reduced.

<Relationship Between Radiation rate and Radiation Heat Absorptivity of a Substance>

In general, since a substance such as metal absorbs a part of solar radiation heat and the like and reflects every other radiation, the relational expression "$\alpha + \rho = 1$" is approved between absorptivity a and reflectivity $\rho$, from which it is understandable that transmission does not occur in a visible light zone and an infrared zone. However, a material such as glass or plastics is a gray body which absorbs a part of solar radiation heat and the like, then reflects a part thereof and further transmits a part thereof. In the case of such gray body, the relational expression "$\alpha + \rho + \tau = 1$" is approved among absorptivity $\alpha$, reflectivity $\rho$ and transparency $\tau$, from which it is understandable that some radiation heat is transmittable in a visible light zone and an infrared zone.

Since such absorptivity and emissivity of heat is equal according to Kirchhoff's law, it is preferable to select a material wherein the transparency is large and absorptivity is small within the wavelength range of heat radiation from a glass, namely, within the wavelength band of heat radiation at ordinary temperature, in order to insulate radiation heat from the glass heated by solar radiation to become high temperature. The wavelength band of heat radiation at ordinary temperature here is in the range of 5 to 50 µm.

That is, when a heat-radiation-preventive coating film consisting of a water-based heat-radiation-preventive coating material for glasses of the present invention is formed on the surface of a glass substrate so that the radiation heat absorptivity within the wavelength range of 5 to 50 µm of said coating film becomes smaller than that of said glass substrate, the amount of radiation heat transfer with in the wavelength band of heat radiation at ordinary temperature from the surface of said coating film will be further reduced.

As just described, it is preferable to form a heat-radiation-preventive coating film used for the heat-radiation-preventive glass of the present invention so that its visible light transparency is larger than that of the glass substrate and its solar radiation heat absorptivity and radiation heat absorptivity within the wavelength band of heat radiation at ordinary temperature are both smaller than those of the glass substrate, more preferably that its visible light transparency is 90% or more (most preferably 92% or more), its solar radiation heat absorptivity is 0.01 to 11% and its radiation heat absorptivity within the wavelength band of heat radiation at ordinary temperature is 0.01 to 20%.

When the visible light transparency is smaller than the above range, the heat-radiation-preventive glass having sufficiently high transparency may not be obtained. When the solar radiation heat absorptivity and the radiation heat absorptivity are higher than the above ranges, heat radiation to the inside of a closed space can not be prevented efficiently, and the effect of reducing the thermal load inside according to the present invention may not be demonstrated sufficiently.

The above-mentioned visible light transparency, solar radiation heat absorptivity and radiation heat absorptivity within the wavelength band of heat radiation at ordinary temperature can be adjusted by varying the concentration of the silane coupling agent. There is a tendency that, when the concentration of the silane coupling agent becomes high, the thickness of the coating film becomes thick, and when the concentration becomes low, the thickness becomes thin. By adjusting the thickness of the coating film, the desired visible light transparency, solar radiation heat absorptivity and radiation heat absorptivity within the wavelength band of heat radiation at ordinary temperature can be obtained.

<Thickness of the Heat-Radiation-Preventive Coating Film>

Though the thickness of the heat-radiation-preventive coating film of the present invention is not particularly restricted, since there is a tendency that, when the thickness of a material absorbable of radiation, for example light, is large, the amount of radiation heat absorption becomes increased and when it is small, the amount of radiation heat absorption becomes reduced according to Lambert-Bert Law, it is possible also in the present invention to make visible light transparency larger and to make solar radiation heat absorptivity and radiation heat absorptivity within the wavelength band of heat radiation at ordinary temperature smaller by reducing the thickness of the coating film to a certain degree to reduce radiation heat absorption.

Therefore, with regard to the thickness of the coating film of the present invention, it is preferable just to coat thinly on the glass substrate so that the thickness complies with the above range of visible light transparency, solar radiation heat absorptivity and radiation heat absorptivity within the wavelength band of heat radiation at ordinary temperature. Though there is no particularly definite restriction for the film thickness, the lower limit thickness is preferably 0.01 µm, more preferably 0.02 μm, most preferably 0.04 μm, and the upper limit thickness is preferably 10 μm, more preferably 5 μm, most preferably 1 μm. When the coating film is too thick, there is a tendency not only that the visible light transparency decreases but also that the amount of heat absorption increases, and solar radiation heat absorptivity and radiation heat absorptivity within the wavelength band of heat radiation at ordinary temperature become large.

<Measuring Method of Radiation Heat Absorptivity>

The measuring method of radiation heat absorptivity within the wavelength band of heat radiation at ordinary temperature of the heat-radiation-preventive coating film in the heat-radiation-preventive glass according to the present invention is as follows:

Based upon the measuring method within the wavelength band of heat radiation at ordinary temperature according to JIS-R-3106, reflectivity is measured by applying a coating film on an aluminum plate and by referring the value of standard reflectivity according to JIS-R-3106 using a common infrared spectrophotometer for chemical analysis. On the basis that the relational expression "$\alpha+\rho+\tau=1$" is materialized among absorptivity $\alpha$, reflectivity $\rho$ and transparency $\tau$ of a gray body, the absorptivity $\alpha$ has been calculated by the formula "absorptivity $\alpha=1-($reflectivity $\rho+$transparency $\tau)$". As for the transparency $\tau$, by measuring the reflectivity of the aluminum plate and the reflectivity of the aluminum plate on which the coating film is formed, and the difference thereof has been made into the transparency of the coating film.

In addition, since the radiation heat absorption by the coating film formed on an aluminum plate is carried out twice, i.e. at the time that the radiation heat is entered and that it is reflected to come out, the absorptivity $\alpha$ is qualified as ½ of a measured value.

This figure is used as a theoretical value and qualified as radiation heat absorptivity within the wavelength band of heat radiation at ordinary temperature of the coating film formed on the surface of a glass and a polyester film. Additionally, the figure calculated by qualifying the reflection occurring on the surface of a coating film as 0 is used here.

As for the visible light transparency and solar radiation heat absorptivity, the values with a glass only and a glass on which the coating film is formed are measured based upon JIS-R-3106 and the differences thereof are qualified the visible light transparency and the solar radiation heat absorptivity of the coating film.

(3) Heat-Radiation-Preventive Glass

Then, the heat-radiation-preventive glass of the present invention is explained according to the accompanying drawings.

The FIG. 1 is a cross-sectional drawing which shows a structure of an example of the heat-radiation-preventive glass of the present invention wherein a coating film 2 formed from the water-based heat-radiation-preventive coating film for glasses of the present invention is applied on one side of a glass substrate 1. Said coating film is preferably the one wherein its visible light transparency is larger than that of the glass substrate (more preferably 90% or more, further preferably 92% or more), and the solar-radiation heat absorptivity and the radiation heat absorptivity within the wavelength band of heat radiation at ordinary temperature are both smaller than those of the glass substrate (preferably the solar-radiation heat absorptivity is 0.01 to 11% and the radiation heat absorptivity within the wavelength band of heat radiation at ordinary temperature is 0.01 to 20%).

The shape of the heat-radiation-preventive glass of the present invention is not particularly restricted, and it can be formed in arbitrary forms such as a rectangle, a circle, a cylindrical form, a hemispherical form and a spherical form. Moreover, it may be a glass processed on its surface in the shape of waveform, irregularity, projections and the like.

The example of the heat-radiation-preventive glass shown by the FIG. 1 is an example wherein each of the glass substrate and the coating film is a single layer respectively. However, either or both of the glass substrate and the coating film may be a complex structured to a multilayer. In this case, it is desirable that the layer contacting to the airspace of the inside of a closed space (the innermost layer) among the layers composing the multilayer coating film be a heat-radiation-preventive coating film layer formed by said water-based heat-radiation-preventive coating material for glasses.

The heat-radiation-preventive glass of the present invention can be used as a window glass of structures, buildings, vehicles and the like. Besides, it is possible to apply the heat-radiation-preventive coating film to a window glass of structures, buildings, vehicles and the like which already exist from before to form a heat-radiation-preventive glass of the present invention.

To be more precise, the heat-radiation-preventive glass of the present invention as mentioned above can be utilized effectively as window glasses and glass building materials of houses, cold insulated storages, ceilings, walls, vehicles, various containers and the like.

In order to reduce heat radiation from a heated glass, radiation heat absorptivity can also be reduced by coating materials such as metal and ceramics having large reflectivity and small absorptivity onto a surface of the glass. Therefore, it is also possible to reduce radiation from a heated glass by using a product of prior art technology as a result. However, since a visible light is also reflected in such case, the inside will become dark. Besides, when disposing the metal layer having large reflectivity so as to face the open air side, a good deal of heat absorbed by the glass will be radiated into the inside and the thermal load of the inside will be increased. In the case that the metal layer is disposed in the interlayer of the multilayer system, since the low-radiative surface is not disposed to face the inside of a closed space, the thermal load of the inside will not be reduced either and the effect of the present invention is not achieved.

As mentioned above, such a heat-radiation-preventive glass like that of the present invention that makes it possible to prevent only heat radiation at ordinary temperature from a heated glass and to reduce the thermal load of the inside of a room or in the car caused by solar radiation without reducing the transparency of visible light the glass has by nature, by applying a coating film having small radiation heat absorptivity formed from a coating material containing a silane coupling agent to the inside of a window glass of buildings, vehicles and the like has been previously unknown.

3. Method of Producing a Heat-Radiation-Preventive Glass:

The method of producing a heat-radiation-preventive glass of the present invention by applying a coating film on a glass substrate comprises a coating step of forming a coating layer by coating a water-based heat-radiation-preventive coating material for glasses of the present invention as mentioned above, and a desiccating step of desiccating said coating layer to form a heat-radiation-preventive coating film.

Examples of methods for treating with a silane coupling agent generally include wet processing and dry processing.

The method of coating a water-based heat-radiation-preventive coating material for glasses of the present invention may be either of them and can be selected arbitrarily from the group of conventional methods for applying a coating layer on a glass substrate.

As for the desiccating step, the method of desiccating is not particularly restricted either, and can be selected appropriately from the group of conventional methods for desiccating of general coating materials.

In this case, it is desirable to form the heat-radiation-preventive coating film thinly by arranging the thickness so that its visible light transparency is larger than that of the glass substrate and its solar radiation heat absorptivity and radiation heat absorptivity within the wavelength band of heat radiation at ordinary temperature are both smaller than those of the glass substrate. More preferably, it is desirable to form the coating film so that it has the thickness wherein the visible light transparency is 90% or more (more preferably 92% or more), the solar radiation heat absorptivity is 0.01 to 11% and the radiation heat absorptivity within the wavelength band of heat radiation at ordinary temperature is 0.01 to 20%.

4. Method of Preventing Heat Radiation

The method of preventing heat radiation of the present invention is the method characterized in that the heat-radiation-preventive glass of the present invention as mentioned above is disposed so that the glass substrate side faces the radiation side of solar radiation heat (and absorbs the solar radiation heat) to prevent the heat radiation from said heat-radiation-preventive coating film side.

That is, it is disposed so that the side of applying the heat-radiation-preventive coating film of the heat-radiation-preventive glass faces the inside of a closed space such as buildings and vehicles. By the above method, heat radiation from the glass which absorbed solar radiation and has become high temperature to the inside can be prevented effectively.

Moreover, also by forming the above-mentioned coating film on the lateral face of the inside of a closed space such as the inside of a room or in the car of window glasses of structures, buildings, vehicles and the like which already exist from before, it is possible to intercept heat radiation at ordinary temperature from a glass heated to become high temperature and to reduce a thermal load of the inside of a room or in the car caused by solar radiation.

BRIEF DESCRIPTION OF THE DRAWINGS

In FIG. 1, "1" represents a glass substrate, "2" represents a coating film, "A" represents the side wherein solar-radiation heat is irradiated and "B" represents the inside of a closed space.

BEST MODE OF CARRYING OUT THE INVENTION

Figure 1:
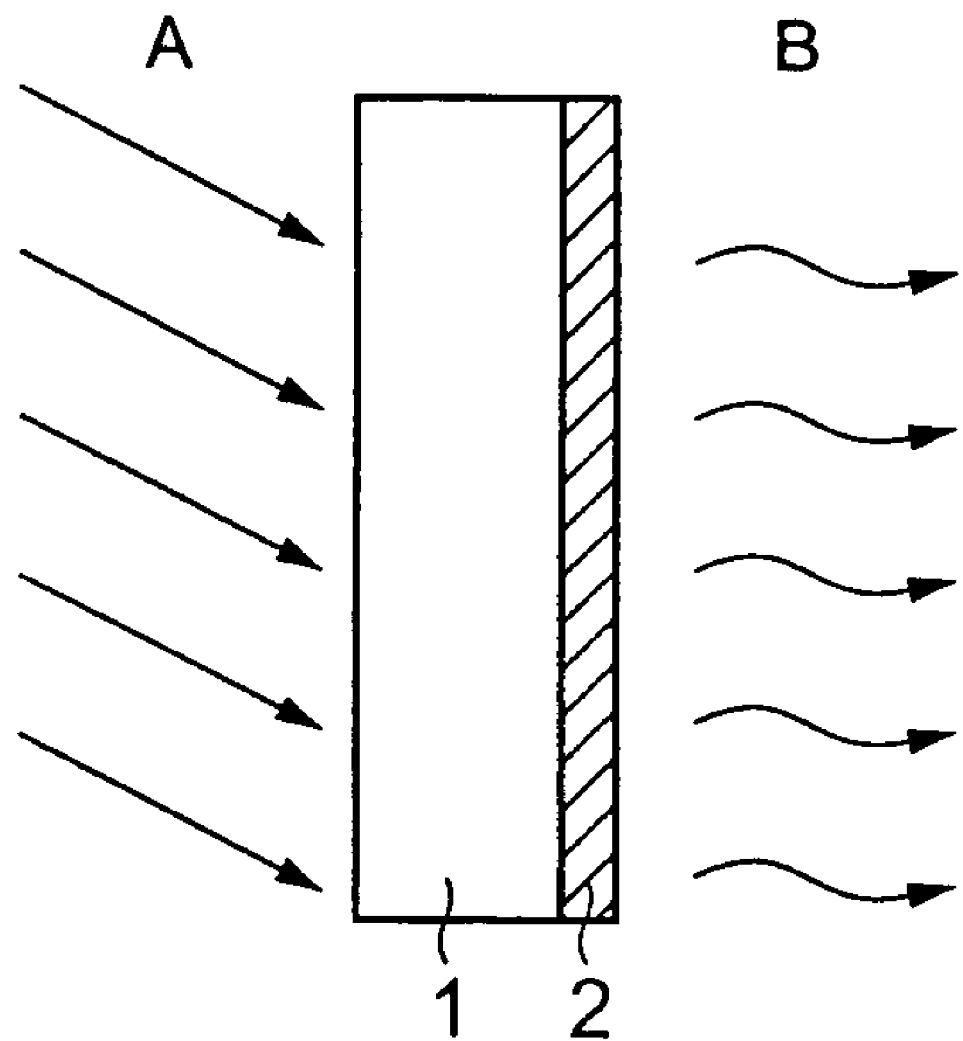
FIG. 1 is a cross-sectional drawing which shows the structure of a heat-radiation-preventive glass of the present invention.

The present invention is illustrated specifically by the following embodiments, but the present invention is not restricted only to these embodiments.

Example 1

Deionized waters having the total anion content of 51.3, 102.7, 302.5, 558.9 and 750 respectively (each unit was "mgCaCO$_3$/L") were prepared by adding salt-consisting materials of CaCO$_3$, NaCl, KCl, MgSO$_4$ and FeSO$_4$, and SiO$_2$ as a free acid in water purified by using a cation-exchange resin and an anion-exchange resin.

N-β(amino ethyl) γ-amino propyl triethoxy-silane (bland name "KBM603": manufactured by Shin-Etsu Chemical Co., Ltd.) was dissolved in the above water, to prepare solutions of 0.001%, 0.005%, 0.01%, 0.1%, 1.0%, 3.0%, 5.0% and 6.0% (each was "% by weight"; it is the same as that of the following). Then, these solutions were put in the constant temperature bath kept at 60° C., and the state of gelation of the solutions after 24-hour progress was checked by visual observation. The result was shown in Table 1.

TABLE 1

| Silane coupling agent | Total anion content 51.3 mgCaCO$_3$/L | Total anion content 102.7 mgCaCO$_3$/L | Total anion content 302.5 mgCaCO$_3$/L | Total anion content 558.9 mgCaCO$_3$/L | Total anion content 750 mgCaCO$_3$/L |
|---|---|---|---|---|---|
| 0.001% | ⊚ | ⊚ | ⊚ | ⊚ | Δ |
| 0.005% | ⊚ | ⊚ | ⊚ | ⊚ | Δ |
| 0.01%  | ⊚ | ⊚ | ⊚ | ⊚ | Δ |
| 0.1%   | ⊚ | ⊚ | ⊚ | ⊚ | Δ |
| 1.0%   | ⊚ | ⊚ | ⊚ | ⊚ | X |
| 3.0%   | ⊚ | ⊚ | ⊚ | ⊚ | X |
| 5.0%   | ⊚ | ⊚ | ⊚ | ⊚ | X |
| 6.0%   | ⊚ | ⊚ | ⊚ | ⊚ | X |

⊚: Not gelated
Δ: A little gelated
X: Much gelated

It turns out that the gelation occurs when N-β(amino ethyl) γ-amino propyltriethoxy silane ("KBM603": manufactured by Shin-Etsu Chemical Co., Ltd.) as a silane coupling agent is mixed with deionized water having the total anion content of more than 700 mgCaCO$_3$/L.

Example 2

In the solution wherein 1.2% by weight of acetic acid was mixed with the deionized water prepared in Example 1, γ-glycidoxy propyl trimethoxy silane ("KBM403": manufactured by Shin-Etsu Chemical Co., LTD.) was dissolved to prepare solutions of 0.001%, 0.005%, 0.01%, 0.1%, 1.0%, 3.0%, 5.0% and 6.0%. Then, these solutions were put in the constant temperature bath kept at 60° C., and the state of gelation of the solutions after 24-hour progress was checked by visual observation. The result was shown in Table 2.

TABLE 2

| Silane coupling agent | Total anion content 51.3 mgCaCO$_3$/L | Total anion content 102.7 mgCaCO$_3$/L | Total anion content 302.5 mgCaCO$_3$/L | Total anion content 558.9 mgCaCO$_3$/L | Total anion content 750 mgCaCO$_3$/L |
|---|---|---|---|---|---|
| 0.001% | ⊚ | ⊚ | ⊚ | ⊚ | ⊚ |
| 0.005% | ⊚ | ⊚ | ⊚ | ⊚ | ⊚ |
| 0.01% | ⊚ | ⊚ | ⊚ | ⊚ | ⊚ |
| 0.1% | ⊚ | ⊚ | ⊚ | ⊚ | ⊚ |
| 1.0% | ⊚ | ⊚ | ⊚ | ⊚ | ⊚ |
| 3.0% | ⊚ | ⊚ | ⊚ | ⊚ | Δ |
| 5.0% | ⊚ | ⊚ | ⊚ | ⊚ | Δ |
| 6.0% | ⊚ | ⊚ | ⊚ | ⊚ | Δ |

⊚: Not gelated
Δ: A little gelated
X: Much gelated

It turns out that the gelation occurs when γ-glycidoxy propyl trimethoxy silane ("KBM403": manufactured by Shin-Etsu Chemical Co., LTD.) is mixed with deionized water having the total anion content of more than 700 mgCaCO$_3$/L.

Example 3

In the deionized water prepared in Example 1, a silane coupling agent ("KBM6123": manufactured by Shin-Etsu Chemical Co., LTD.) was dissolved to prepare solutions of 0.001%, 0.005%, 0.01%, 0.1%, 1.0%, 3.0%, 5.0% and 6.0%. Then, these solutions were put in the constant temperature bath kept at 60° C., and the state of gelation of the solutions after 24-hour progress was checked by visual observation. The result was shown in Table 3.

TABLE 3

| Silane coupling agent | Total anion content 51.3 mgCaCO$_3$/L | Total anion content 102.7 mgCaCO$_3$/L | Total anion content 302.5 mgCaCO$_3$/L | Total anion content 558.9 mgCaCO$_3$/L | Total anion content 750 mgCaCO$_3$/L |
|---|---|---|---|---|---|
| 0.001% | ⊚ | ⊚ | ⊚ | ⊚ | Δ |
| 0.005% | ⊚ | ⊚ | ⊚ | ⊚ | Δ |
| 0.01% | ⊚ | ⊚ | ⊚ | ⊚ | Δ |
| 0.1% | ⊚ | ⊚ | ⊚ | ⊚ | Δ |
| 1.0% | ⊚ | ⊚ | ⊚ | ⊚ | Δ |
| 3.0% | ⊚ | ⊚ | ⊚ | ⊚ | Δ |
| 5.0% | ⊚ | ⊚ | ⊚ | ⊚ | X |
| 6.0% | ⊚ | ⊚ | ⊚ | ⊚ | X |

⊚: Not gelated
Δ: A little gelated
X: Much gelated

It turns out that the gelation occurs when a silane coupling agent ("KBM6123": manufactured by Shin-Etsu Chemical Co., Ltd.) is mixed with deionized water having the total anion content of more than 700 mgCaCO$_3$/L.

Example 4

N-β(amino ethyl) γ-amino propyl triethoxy silane ("KBM603": manufactured by Shin-Etsu Chemical Co., Ltd.) was dissolved in the deionized water having the total anion content of 51.3 mgCaCO$_3$/L used in Example 1 to prepare 0.01%-solution (Sample No. 1), 0.1%-solution (Sample No. 2), 1.0%-solution (Sample No. 3), 3.0%-solution (Sample No. 4) and 5.0%-solution (Sample No. 5) as water-based heat-radiation-preventive coating materials for glasses.

Then, eight same boxes with the outer size of 50 cm by 50 cm and a height of 50 cm made from styrene foam wherein one direction was open were prepared. In addition, glass plates wherein the heat-radiation-preventive coating films were applied by coating the above-mentioned water-based heat-radiation-preventive coating materials for glasses onto one side of glass substrates and desiccating the same (heat-radiation-preventive glasses), and glass plates without coating were prepared. (Thickness of the heat-radiation-preventive coating films; Sample No. 1=0.04 μm, Sample No. 2=0.05 μm, Sample No. 3=0.06 μm, Sample No. 4=0.07 μm, Sample No. 5=0.08 μm. Thickness of glass substrates; 5 mm)

Then, the above-mentioned glass plates were closely adhered to the open part of the above-mentioned boxes made from styrene foam so that the applied side of heat-radiation-preventive coating film faces to the inside of the boxes in the case of using heat-radiation-preventive glasses to prepare test bodies.

The test bodies were installed in a wide place where sunlight is irradiated well so that the opening in which the glass plates were attached was directed upwards. The inside temperature of the boxes was measured when said temperature comes to equilibrium as the sunlight was radiated. Theoretical values were used for the visible light transparency, the solar-radiation heat absorptivity and the radiation heat absorptivity at the wavelength zone of heat radiation at ordinary temperature of the coating film. The outside air temperature at this time was 33.8° C. The result was shown in Table 4.

TABLE 4

| Test samples | Solar radiation heat absorptivity of the coating film (%) | Radiation heat absorptivity of the wavelength band of heat radiation at ordinary temperature (%) | Visible light transparency of the coating film (%) | Equilibrium temperature of the box inside (° C.) |
|---|---|---|---|---|
| 0.01% solution | 0.08 | 0.12 | 99.9 | 50.3 |
| 0.1% solution | 0.11 | 0.55 | 99.8 | 50.5 |
| 1.0% solution | 0.19 | 3.24 | 99.8 | 50.3 |
| 3.0% solution | 0.24 | 4.21 | 99.8 | 50.4 |
| 5.0% solution | 0.25 | 4.78 | 99.8 | 50.4 |
| Glass only | 11.1*[1] | 89.9*[1] | 89.1*[1] | 52.3 |

*[1] solar radiation heat absorptivity, radiation heat absorptivity and visible light transparency of a glass plate only When the solution of 0.1% to 5.0% is coated, the coating film wherein the visible light transparency is 99.8% or more, solar radiation heat absorptivity is in the range of 0.08% to 0.25% and radiation heat absorptivity of wavelength band of heat radiation at ordinary temperature is in the range of 0.12% to 4.78% is formed and the equilibrium temperature of the box inside when sunlight is radiated shows a reduction of 1.8° C. to 2.0° C., from which it turns out that the heat radiation from the glass surface to the box inside is reduced.

INDUSTRIAL APPLICABILITY

The water-based heat-radiation-preventive coating material for glasses of the present invention enables a heat-radiation-preventive coating film excellent in close adhesion and in durability having large visible light transparency and small solar radiation heat absorptivity and radiation heat absorptivity of heat radiation at ordinary temperature to be evenly and easily formed, by coating on one side of various glass substrates used as window glasses of structures, buildings, vehicles and the like and desiccating it.

The heat-radiation-preventive glass of the present invention wherein such heat-radiation-preventive coating film is applied on one side of a glass substrate has high transparency in a visible light zone and is capable to prevent heat radiation effectively from the glass heated by solar radiation to become high temperature to the coating film side. Therefore, by disposing the glass so that said coating film faces the inside of a closed space such as the inside of a room or in the car, the heat radiation to the space inside can be prevented effectively and a good deal of the heat absorbed by the glass can be radiated to the open air to reduce the thermal load of the space inside.

In addition, since the visible light transparency that glasses have by nature is not deteriorated, increase in temperature inside can be suppressed without darkening the inside of a room or in the car. Therefore, it can be used effectively as window glasses or glass building materials of houses, insulated storages, ceilings, walls, vehicles, various containers and the like.

The invention claimed is:

1. A method of preventing heat radiation from a glass which has absorbed solar-radiation heat, wherein a heat-radiation-preventive glass which comprises a heat-radiation-preventive coating film formed from a coating layer of a water-based heat-radiation-preventive coating material for glasses consisting essentially of deionized water having a total anion content of 700 mgCaCO$_3$/L or lower and 0.001 to 6% by weight of a silane coupling agent represented by the following general formula (I) based upon the total weight of the deionized water, is disposed so that said heat-radiation-preventive coating film becomes the outermost layer on the entire surface of the heat-radiation-preventive glass and the glass substrate side faces the direction from which solar-radiation heat is irradiated whereby heat radiation from said heat-radiation-preventive coating film side is prevented,

(I)

where X is a group selected from the group consisting of an amino group, an aminoalkyl group, a vinyl group, an epoxy group, a glycidoxy group, an acryl group, a methacryl group, a mercapto group and an alkyl group containing groups selected from the group consisting of an amino group, an aminoalkyl group, a vinyl group, an epoxy group, a glycidoxy group, an acryl group, a methacryl group and a mercapto group, and $R_1$, $R_2$, and $R_3$ are, each independently, OH or a group capable of generating a silanol upon hydrolysis and they may be the same or different from each other.

* * * * *